Patented Apr. 21, 1953

2,636,018

UNITED STATES PATENT OFFICE 2,636,018

STYRENE-UNSATURATED ALKYD RESIN CASTING COMPOSITIONS

Louis C. Rubens and Raymond F. Boyer, Midland, Mich., assignors to The Dow Chemical Company, Midland, Mich., a corporation of Delaware No Drawing. Original application July 10, 1946, Serial No. 682,593. Divided and this application October 17, 1949, Serial No. 121,885

8 Claims. (Cl. 260—33.8)

This invention relates to improved vinyl aromatic resin-forming compositions and to resins produced by polymerization thereof.

This application is a division of our co-pending application Serial No. 682,593 filed July 10, 1946, now Patent No. 2,609,353.

The interpolymerization of styrene with roughly equal or larger proportions of an unsaturated alkyd resin produces plastic materials which are used commercially as casting resins. However, the monmeric compositions are comparatively expensive, and the polymeric products have dielectric characteristics which limit their usefulness as insulating materials where radio-frequency currents are involved.

It is accordingly an object of the invention to provide improved vinyl aromatic casting compositions which are materially less expensive than those heretofore used for these purposes and which polymerize rapidly to resins having excellent physical and electrical properties.

The invention is based on the discovery that a small proportion of an unsaturated alkyd resin markedly accelerates the rate of polymerization of styrene and other monovinyl aromatic compounds, and that the resulting polymers possess very desirable physical properties while largely retaining the excellent dielectric characteristics of the pure vinyl aromatic polymers. By taking advantage of this discovery, a number of exceptional casting resin compositions may be formulated.

In so far as known, the catalytic effect of unsaturated alkyd resins is observed in the polymerization of polymerizable monovinyl aromatic compounds generally. Typical of such materials are the monovinyl aromatic hydrocarbons and halohydrocarbons such as styrene, p-ethyl styrene, dimethyl styrene, p-chlorostyrene, dichlorostyrene, and vinyl naphthalene. Styrene is at present of principal commercial importance.

The term "unsaturated alkyd resin," following conventional practice, is here used to refer to the unmodified and modified polyhydric alcohol polyesters of alpha-unsaturated-alpha-beta-polycarboxylic acids. Typical of the polyhydric alcohls used in making such resins are ethylene glycol, di-, tri-, and tetra-ethylene glycol, propylene glycol, dipropylene glycol, trimethylene glycol, glycerol, and pentaerythritol. Examples of the alpha-unsaturated-alpha-beta-polycarboxylic acids are maleic, fumaric, chloromaleic, chlorofumaric, citraconic and mesaconic acids. In making the unmodified unsaturated alkyd resins, one or more of the foregoing alcohols is heated with a roughly equivalent proportion of one or more of the acids named, their anhydrides, or compounds which liberate the acids, for a time sufficient to complete condensation to a resinous polyester. In making modified unsaturated alkyd resins, a part, or even nearly all, of the unsaturated polycarboxylic acid may be replaced by a saturated poly- or mono-carboxylic acid, such as succinic, adipic, phthalic, sebacic, or 12-hydroxy stearic acid. Such resins, both unmodified and modified, are available commercially under a variety of trade-names.

It will be noted that the molecule of each unsaturated alkyd resin contains the functional grouping

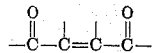

repeated along the polyester chain. The presence of this group is thought to account for the catalytic activity of the unsaturated alkyd resin, since it has been observed that the more frequent the occurrence of the group in the resin, the greater the catalytic effect, i. e. the unmodified unsaturated alkyd resins are more active than the modified resins. It is essential that the active group be repeated along the chain, i. e. that the polyester consist of a number of alcohol and acid units. The simple esters, obtained by condensation of a single polyhydric alcohol molecule with a single polycarboxylic acid molecule, show no catalytic effect. With the polyesters, the activity increases as the molecular weight of the polyester increases. In general, those unsaturated alkyd resins having a molecular weight, as measured by the acid value of the resin, over 500 are quite effective, with molecular weights over 1000 being preferred.

The proportion of unsaturated alkyd resin required to catalyze the polymerization of vinyl aromatic compounds is not large, as low as 0.5 per cent by weight of the total polymerizable material being effective. Increasing proportions of the resin give a somewhat greater effect. In general, not over 10 per cent of resin should be used, since larger amounts may impair the dielectric properties of the polymer; 1 to 5 per cent is preferred. With those unsaturated alkyd resins which are not soluble in vinyl aromatic compounds to the extent of 10 per cent, it is well to limit the amount of resin to that which will dissolve readily. Modified resins are somewhat more soluble than the unmodified ones.

Small proportions of unsaturated alkyd resins are not only active per se in catalyzing the polymerization of vinyl aromatic compounds, but they are also effective in accelerating the rate of polymerization of such materials in the presence of conventional polymerization catalysts. By far the best results are obtained when the unsaturated alkyd resins are used to accelerate the polymerization of vinyl aromatic compounds in the presence of organic peroxide catalysts, such as benzoyl and lauroyl peroxides. By using both an unsaturated alkyd resin and a peroxide, extremely rapid but controllable rates of polymerization may be realized and polymers of desiraly high molecular weight prepared.

The unsaturated alkyd resin catalyst is not only effective in catalyzing the polymerization of monovinyl aromatic compounds alone, but is also active in the copolymerization of such compounds with lesser proportions of other polymerizable substances, i. e. in polymerizing monomeric materials generally in which a polymerizable monovinyl aromatic compound is the major polymerizable constituent.

In practice, the monovinyl aromatic compound to polymerized, e. g. styrene, is mixed with 0.5 to 10 per cent by weight of an unsaturated alkyd resin, and another catalyst, if desired, e. g. 0.1 to 5 per cent of lauroyl peroxide, is added. The mixture is then heated at a polymerizing temperature, e. g. 50° C. or higher, until polymerization is complete.

If it is desired to store the vinyl aromatic compound-unsaturated alkyd resin mixture at room temperature before use, a small proportion of a conventional inhibitor, e. g. p-tert.-butyl catechol or hydroquinone, may be added. Such inhibitor does not destroy the catalytic effect of the unsaturated alkyd resin when polymerization is later initiated by heating.

By utilizing the principles of the invention, a number of casting resin compositions of extremely valuable properties may be formulated, e. g. resins for use as insulation in radio-frequency electrical equipment. Such casting compositions must be capable of polymerizing rapidly in place without excessive shrinkage when heated at very moderate temperatures. The resulting resins must have exceptional dielectric properties, and high resistance to mechanical shock, and must not flow at temperatures up to 100° C., and yet must not be brittle in extreme cold.

Casting compositions of this character may be prepared, according to the invention, by adding to a mixture of a monovinyl aromatic compound and an unsaturated alkyd resin catalyst from 10 to 50 per cent by weight of an aliphatic-chain hydrocarbon polymer incompatible with the polymerized vinyl aromatic compound. Polyisobutylene and polyethylene are typical incompatible aliphatic-chain hydrocarbon polymers, with polyisobutylene being preferred. On polymerization, such mixtures set to soft wax-like solids of excellent electrical characteristics which do not become brittle even at −40° C.

It is desirable to incorporate in these vinyl aromatic compound-alkyd resin-hydrocarbon polymer casting mixtures from about 1 to about 10 per cent, preferably 2 to 7 per cent, of a polymerizable polyolefinic compound, such as divinyl benzene, to insure early gelation of the monomeric mixture on heating and to raise the heat-distortion temperature of the final product. Other polymerizable polyolefinic compounds which may be used are diallyl phthalate, allyl acrylate, diallyl ether, glycol diacrylate, and many others.

It is also desirable, in making this type of casting composition for electrical use, to include an inert filler to limit shrinkage on polymerization. Preferred fillers should have a very low dielectric loss, such as chlorinated diphenyl resins, hydrogenated polystyrene, or hydrogenated polyindene. The filler should ordinarily represent from 10 to 50 per cent by weight of the vinyl aromatic compound.

In practice, the casting compositions are formulated by mixing the monovinyl aromatic compound, unsaturated alkyd resin, aliphatic-chain hydrocarbon polymer, polyolefinic compound, and filler in the proportions stated. Such a mixture, preferably with inhibitor added, may be stored until ready for use. At that time, an organic peroxide catalyst is preferably added and the mixture is poured into an appropriate vessel in which the electrical parts to be embedded are inserted. Moderate heat is then applied in conventional manner until the resin is cured. The dielectric properties and impact strengths of these resins much exceed those of casting resins heretofore available.

The following example will illustrate the invention, but is not to be construed as limiting its scope.

*Example*

An electrical casting resin composition was prepared from styrene, an unsaturated alkyd resin, polyisobutylene (molecular weight 12,000), the chlorinated diphenyl resin Arochlor 5460, which has a density of 1.74, a refractive index of 1.66, and a softening point of 100°–105° C., a crude divinyl benzene containing 40 per cent by weight of the latter, the balance being ethyl styrene, and p-tert.-butyl catechol as a storage inhibitor. The proportions were:

| Ingredient: | Parts by weight |
|---|---|
| Styrene | 47.2 |
| Unsaturated alkyd resin | 0.8 |
| Polyisobutylene | 23 |
| Arochlor 5460 | 23 |
| Divinyl benzene (crude) | 6 |
| p-Tert.-butyl catechol | 0.005 |

Immediately before use, 1 per cent of lauroyl peroxide was added as a catalyst. The mixture is a syrup which is easily cast. It will set to a stiff gel in 2 hours at 50° C. and to a wax-like solid in 18 to 24 hours at the same temperature. Some of the properties of the solid resin are:

| | |
|---|---|
| Tensile strength | 1000 p. s. i. |
| Impact strength — Izod unnotched | 2.0 inch-pounds. |
| Hardness—Rockwell | 104—15X—60. |
| Heat distortion | 84° C. |
| Temperature at which resin flows under its own weight | Above 200° C. |
| Power factor at 1.0 megacycle | 0.13 per cent. |
| Dielectric constant | 2.56. |

The low tensile strength is desirable since it permits ready removal of the cast resin from electrical equipment in case of trouble.

Other ways of applying the principle of the invention may be employed in addition to those described, change being made as regards the details disclosed, provided the method or composition recited in any of the following claims is used.

We claim:

1. A resin-forming composition useful for producing a cast electrical insulating resin consisting essentially of (a) styrene, (b) from 1 to 5 per cent by weight thereof of an unsaturated alkyd resin which contains the functional grouping

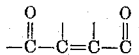

repeated along the polyester chain and has a molecular weight of at least 500 as a polymerization catalyst, (c) polyisobutylene in a proportion from 10 to 50 per cent by weight of the total of (a) and (b), divinyl benzene in a proportion from 2 to 7 per cent by weight of the total of (a), (b) and (c), and a chlorinated diphenyl resin in a proportion from 10 to 50 per cent by weight of the styrene.

2. A synthetic resin consisting essentially of the product of polymerization of the composition of claim 1.

3. A resin-forming composition useful for producing a cast electrical insulating resin consisting essentially of (a) a polymerizable nuclear monovinyl aromatic compound, (b) from 0.5 to 10 per cent by weight thereof of an unsaturated alkyd resin which contains the functional grouping

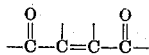

repeated along the polyester chain as a polymerization catalyst, (c) an aliphatic-chain hydrocarbon polymer incompatible with the polymer of the vinyl aromatic compound and selected from the class consisting of polyisobutylene and polyethylene in a proportion from 10 to 50 per cent by weight of the total of (a) and (b), and (d) a polymerizable polyolefinic compound selected from the class consisting of divinyl benzene, diallyl phthalate, allyl acrylate, diallyl ether and glycol diacrylate in a proportion from 1 to 10 per cent by weight of the total of (a), (b) and (c).

4. A composition according to claim 3 in which the aliphatic-chain hydrocarbon polymer is polyisobutylene.

5. A composition according to claim 3 which also contains an inert filler having a low dielectric loss in a proportion from 10 to 50 per cent by weight of the monovinyl aromatic compound.

6. A synthetic resin consisting essentially of the product of polymerization of the composition of claim 3.

7. A synthetic resin consisting essentially of the product of polymerization of the composition of claim 4.

8. A synthetic resin consisting essentially of the product of polymerization of the composition of claim 5.

LOUIS C. RUBENS.
RAYMOND F. BOYER.

References Cited in the file of this patent

UNITED STATES PATENTS

| Number | Name | Date |
|---|---|---|
| 1,613,673 | Ostromislensky | Jan. 11, 1927 |
| 2,282,002 | Scott et al. | May 5, 1942 |
| 2,443,735 | Kropa | June 22, 1948 |
| 2,475,731 | Weith | July 12, 1949 |

FOREIGN PATENTS

| Number | Country | Date |
|---|---|---|
| 540,169 | Great Britain | Oct. 8, 1941 |